Figure 1:
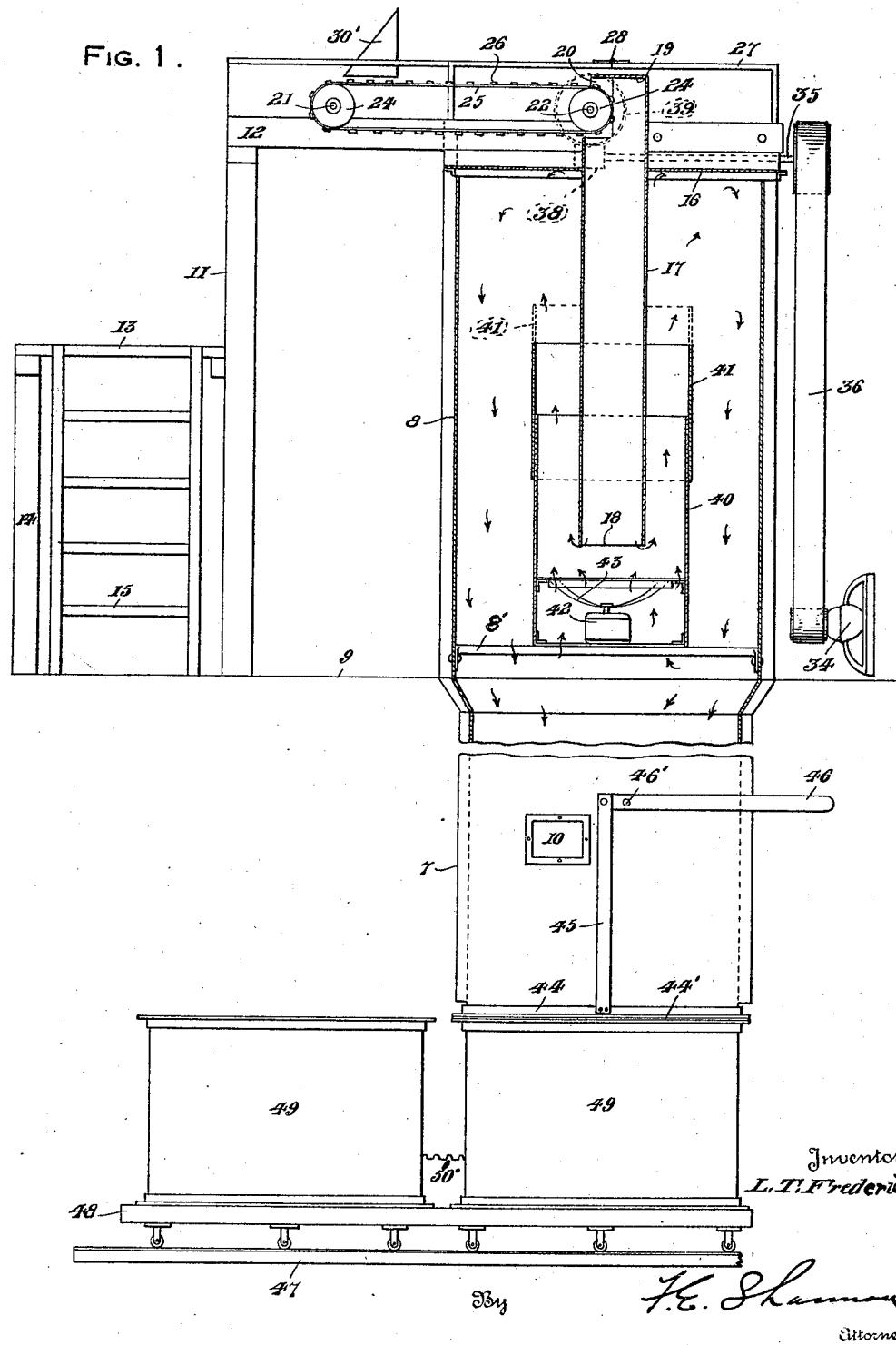

May 8, 1923.

L. T. FREDERICK 1,454,274

MACHINE FOR AND METHOD OF MAKING MICA BOARDS

Filed Sept. 18, 1919      3 Sheets-Sheet 1

Inventor
L. T. Frederick

May 8, 1923. 1,454,274
L. T. FREDERICK
MACHINE FOR AND METHOD OF MAKING MICA BOARDS
Filed Sept. 18, 1919 3 Sheets-Sheet 2

Inventor
L. T. Frederick
By
Attorney

May 8, 1923.
L. T. FREDERICK
1,454,274
MACHINE FOR AND METHOD OF MAKING MICA BOARDS
Filed Sept. 18, 1919  3 Sheets-Sheet 3
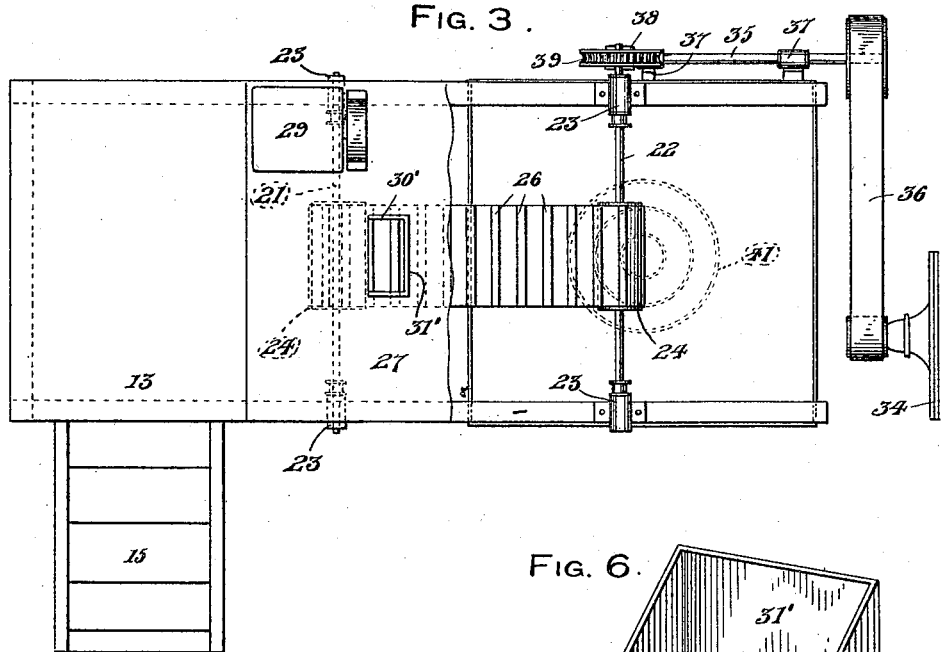
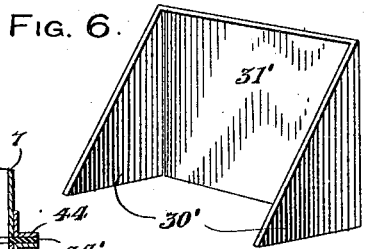
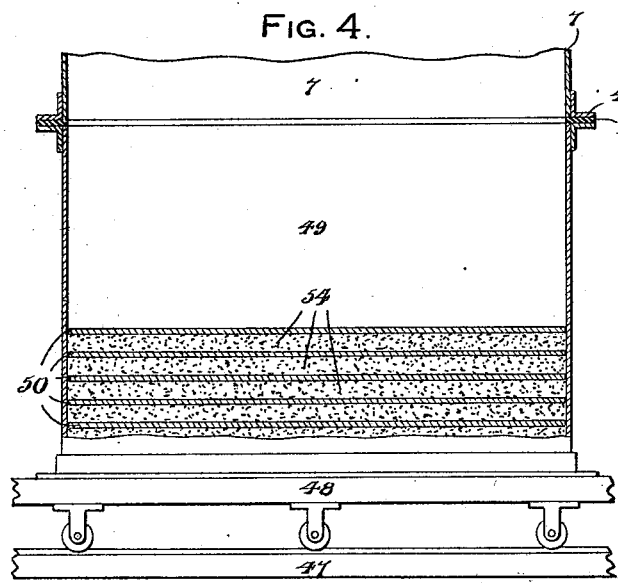
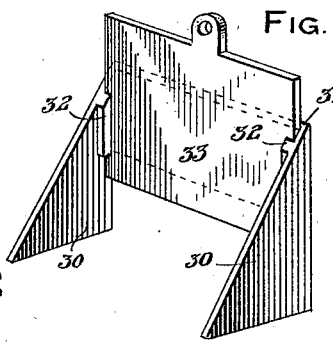
Inventor
L. T. Frederick
By F. E. Shannon
Attorney Patented May 8, 1923.

1,454,274

UNITED STATES PATENT OFFICE.

LOUIS T. FREDERICK, OF AKRON, OHIO.

MACHINE FOR AND METHOD OF MAKING MICA BOARDS.

Application filed September 18, 1919. Serial No. 324,331.

*To all whom it may concern:*

Be it known that I, LOUIS T. FREDERICK, a citizen of the United States, residing at Akron, in the county of Summit and State of Ohio, have invented new and useful Improvements in Machines for and Methods of Making Mica Boards, of which the following is a specification.

The primary object of the present invention resides in the provision of novel devices employed in the manufacture of mica plates or boards wherein the mica in disintegrated flake form is adapted to be delivered onto a blower element whereby the mica flakes are battered and blown upwardly before seeking their level by the law of average upon a catch plate arranged considerable distance below the blower element.

A further object of the invention is to provide a mica building machine wherein the mica flakes are fed directly onto a blower element adapted to cause the flakes to travel in a reverse path from their entry into the machine and having an open-ended cylindrical element enclosing the blower element whereby the upwardly blown and battered flakes are confined within the cylindrical element to insure a decided upward movement of the flakes, an air current of a circuitous path being caused by said blower element whereby some of said flakes are caused to travel on a circuitous path inwardly and outwardly of the cylindrical member enclosing the blower element and with some of the flakes entering the lower end of the cylindrical member and passing outwardly of the upper end thereof.

A further object of the invention is to provide an improved weighing and feeding means for a mica building machine wherein a guard frame is associated with a feed belt to cause an even distribution of the mica flakes over the belt prior to delivery onto the blower element, weighing devices being associated with the tower frame for determining the exact quantity of mica to be delivered at a single operation.

A still further object of the invention resides in the provision of collection receptacles at the lower end of the feeding tower wherein a pair of receptacles are adapted to have positioned therein a metallic plate with one receptacle in air-tight communication with the lower end of the tower and adapted to receive a predetermined quantity of mica flakes therein which in settling upon said plate will seek a natural level, means being provided for alternately shifting the receptacles in opposite directions to cause the idle receptacle to be placed into communication with the lower end of the tower and to permit another plate to be placed upon the mica flakes for again receiving an additional supply.

With the above and other objects in view, the invention consists in the novel form, combination and arrangement of parts herein fully described in connection with the accompanying drawings and wherein like reference characters indicate similar parts throughout the several views.

In the drawings,

Figure 1 is a vertical elevational view of a mica building machine constructed in accordance with the present invention, the same being partly shown in section and partially broken away to illustrate the fan blowing devices and elements associated therewith, and the receptacles positioned at the lower end of the tower.

Figure 2:
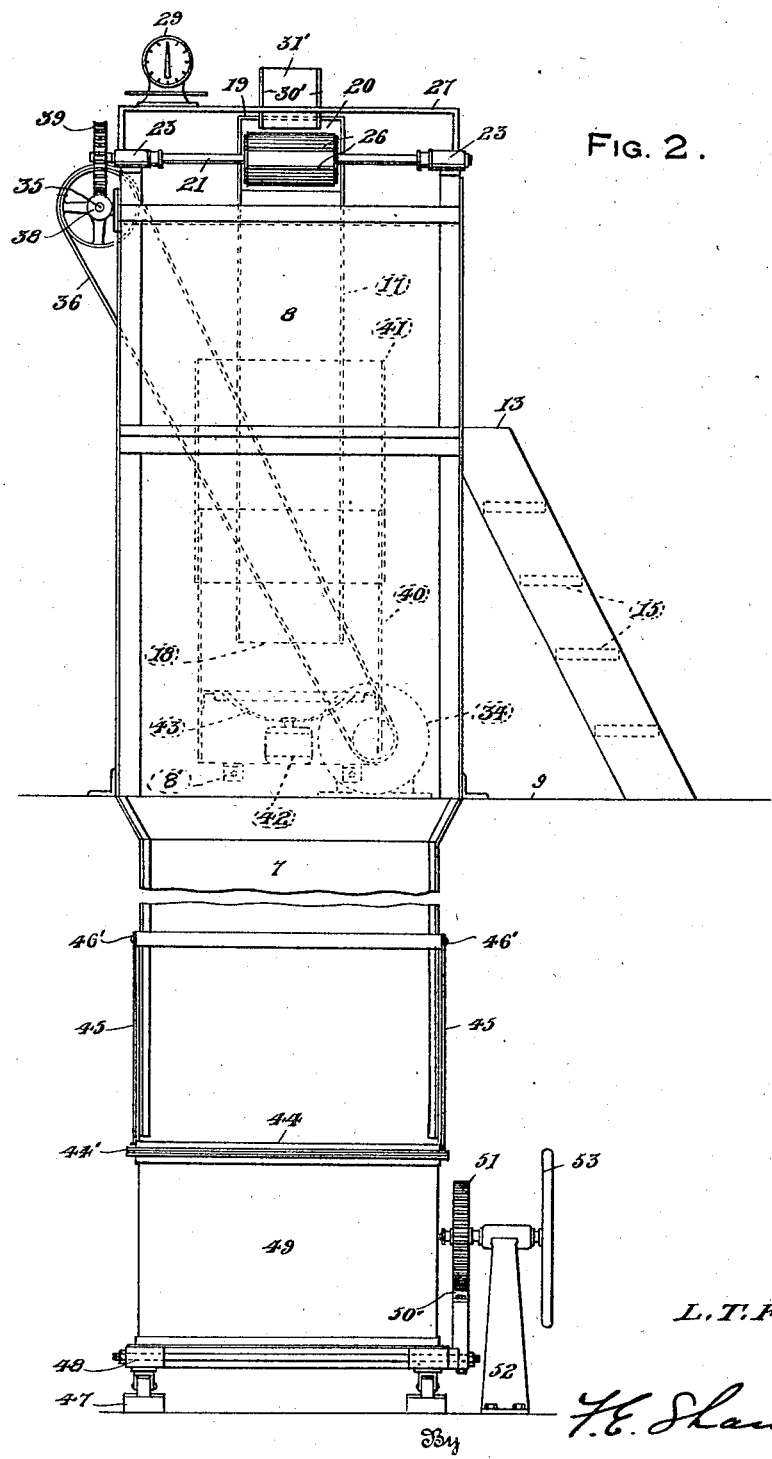

Figure 2 is an end elevational view of the machine illustrated in Figure 1 with the tower partially broken away, and illustrating the rack and pinion for shifting the receiving boxes and the driving mechanism for the feed belt, Figure 3 is a top plan view of the machine, illustrating the feed belt, driving devices thereof, the operator's platform and the weighing devices, Figure 4 is an enlarged detail view of one of the receiving receptacles and adjacent portion of the tower, partly shown in section to illustrate the method of superbuilding the mica boards, Figure 5 is a detail perspective view of the mica guard associated with the feed belt, the same being illustrated as having a vertically movable rear wall, and Figure 6 is a perspective view of a modified form of the mica guard in which the three walls are integrally formed.

Briefly described, the present invention aims to provide improved and novel devices for the manufacture of mica board or like material wherein relatively fine or flaked material is held in suspension and subsequently received on building plates to find their own level, the receiving plates being carried by receptacles associated with the lower end of the tower and adapted for interchangeable connection therewith whereby one receptacle containing a plate with a layer of mica flakes thereon may be removed laterally from communication with the lower end of the tower to position the other receptacle in communication therewith, and to permit another building plate to be positioned upon the layer of mica in the disassociated receptacle. An operator located adjacent the upper end of the tower has control of a scale for weighing the desired quantity of flakes for subsequent disposal within the walls of a guard superposed on an endless feed belt which guard insures an even distribution of the flakes over said belt. A vertical pipe or cylinder is enclosed within the upper end of the casing or tower and is adapted to receive the flakes from the belt and deliver the same directly upon a blower element, such as a fan for directing the flakes upwardly whereby the same are blown and battered to cause a disintegration and subsequently fall upon the building plates in the lower end of the tower as above mentioned. An open ended tubular member is preferably associated with the feed pipe or cylinder and encloses the blower element so that the flakes descending in the pipe will be confined within the tubular member to insure a battering thereof within the confined space thus positively to separate any connected flakes, it being understood that the upper and lower ends of the tubular member enclosing the fan are open and consequently unobstructed so that air currents defining circuitous paths are created to cause some of the flakes to travel therethrough as shown by arrows in the attached drawings. The provision of the tubular member enclosing the fan and being open at its upper and lower end is one of the important features of this invention as the same constitutes an element which, when combined with the fan blower will cause a circuitous current of air therethrough, it being understood that the connection between the lower end of the tower and the receiving receptacle is an air-tight one, and further, is considerably spaced from the blower element so that no air disturbance adjacent the settling end of the tower occurs to effect an even distribution of the mica flakes by the law of average.

Referring more in detail to the accompanying drawings, there is illustrated a tower 7 having an enlarged section 8 at its upper end positioned above the upper floor line 9, windows or doors 10 being provided in the side walls of the tower 7 to permit a visual inspection of the interior of the tower.

The enlarged or upper section 8 of the tower and appurtenances will first be described, and include a frame-work associated with the section 8 embodying vertical standards 11 and the upper horizontal beams 12, a platform 13 being associated with the vertical standards 11 and further supported by legs 14, while a ladder 15 extends from the floor 9 to the platform 13 whereby the operator may easily gain access to the platform 13. It is to be understood that the standards, beams and legs may be constructed of any material desired, as wooden frame-work or metallic angle irons.

A cover 16 closes the upper end of the section 8 and is provided with a central opening through which a downwardly directed pipe or tubular member 17 extends with the lower open end 18 thereof terminating at a point spaced upwardly from and adjacent to the floor 9, the closed upper end 19 projecting above the cover 16 and provided with a lateral opening 20 as clearly shown in Figures 1 and 2.

An endless feed belt is provided for the conveyance of material from a point adjacent the forward edge of the machine at the platform side thereof to the pipe 17 and includes a pair of shafts 21 and 22 journaled in bearings 23 positioned upon the upper edges of the opposite beams 12, the shaft 22 being positioned within the side opening 20 in the upper end of the pipe 17 and each shaft carrying a pulley 24 over which an endless belt 25 is adapted to travel, the outer side thereof being provided with spaced cleats 25 for purposes presently to appear. As illustrated in Figures 1 and 2, a hood 27 is supported on the beams 12 to enclose the mechanism at the upper end of the tower, the hood being hinged together as at 28 to permit a swinging movement of the sections thereof whereby access to the mechanism may be gained.

As illustrated in Figures 2 and 3, platform scales 29 are supported on the forward edge of the hood 27 for purposes of weighing certain quantities of mica flakes to be delivered to the pipe 17. An opening is provided in the hood 27 adjacent the forward end thereof and in proximity of the scales 29 into which the mica guard illustrated in Figure 5 is adapted to be received to assure the position shown in Figures 1 and 2, the same being preferably supported by the hood 27 with the lower edges thereof in proximity to the feed belt 25. The hood illustrated in Figure 5 embodies triangular side plates 30 connected by a rear wall 31 cut away at its lower end as illustrated with cleats 32 carried by the inner face of the side plates 30 slightly spaced from the rear wall 31 to provide a guide for the vertically sliding gate closure 33. If desired, the form of guard illustrated in Figure 6 may be employed wherein the sides 30' are formed integral with the back 31', it being noted that in each instance the lower edge of the side walls 30 are slightly spaced from the belt whereby the mica flakes positioned on the belt may be distributed thereover and ultimately fed to the pipe 17.

Means is provided for the operation of the endless belt 25 and includes a motor 34 operatively connected to the shaft 35 through the medium of the belt drive 36, the shaft 35 being mounted in bearing brackets 37 and carrying a worm 38 that meshes with a gear 39 fixed to the shaft 22 at a point spaced outwardly of the beam 12, suitable switch devices being employed for controlling the operation of the motor 34.

As illustrated in Figures 1 and 2, beams 8′ are supported transversely of the section 8 adjacent the floor line 9 and have mounted thereon the tubular member 40 open at its upper and lower ends as illustrated, and extending upwardly to a point terminating above the lower open end of the pipe 17, while a sliding collar 41 is sleeved upon the upper end of the tubular member 40 to vary the height thereof. A spring motor 42 is supported on the cross beams 8′ and carries a fan 43, the fan being enclosed by the lower end of the tubular member 40 and in position directly to engage the mica flakes delivered through the pipe 17, the fan being hereinafter referred to as the battering means for directing the mica flakes upwardly in the tubular member 40.

The tower 7 is approximately thirty or forty feet in height and is open at its lower end, the same carrying an annular band 44 provided with a belt strip 44′, and being operable by the link 45 connected to the inner end of the lever 46 pivoted as at 46′ to the tower 7. A track 47 is arranged beneath the lower end of the tower 7 and supports a truck 48 which carries box receptacles 49, one of which is shown in detail in Figure 4. A metal mica building plate 50 is positioned in the bottom of each receptacle 49 and one of the receptacles moved into the position as illustrated in communication with the lower end of the tower 7 while the other receptacle is disassociated therewith, the communicating receptacle being sealed against the admission of air by the operating lever 46 shifting the band 44 onto the upper end of the receptacle 49. The mechanism for shifting the receptacle and truck embodies a rack 50′ having teeth upon the upper edge thereof adapted for engagement with the gear 51 mounted upon a shaft journaled in the upper end of a standard 52 and operated by a hand wheel 53 whereby either of the receptacles 49 may be brought into communication with the tower 7.

In the operation of the device, a person standing upon the platform 13 weighs a desired quantity of mica flakes upon the scales 29 and subsequently places the same upon the feed belt 25 through the guard 30. By regulating the height of the gate closure 33 the quantity of mica flakes fed to the pipe 17 is thus controlled, as by lowering the gate closure 33, or with the use of the integral rear wall 31′ of the guard, the flakes are caused to be evenly distributed over the belt and entirely fed to the pipe 27 by the cleats 25 carried by the belt. The mica flakes entering the pipe 17 will descend therein and will fall upon the fan 43, the current of which is upwardly directed in the annular space between the pipe 17 and the tubular member 40 which creates a current in the direction indicated by the arrows, upwardly within the tubular member 40 and downwardly exteriorly thereof, the circuit being continuous with air drawn upwardly through the open lower end of the tubular member 40 and delivered through the open upper end thereof. The mica flakes are held in suspension within the annular chamber surrounding the supply pipe 17 and blown upwardly therefrom, the same being battered to insure a disintegration of any flakes cohering, and in many instances, flakes are redelivered upwardly through the open lower end of the tubular member 40 thus to insure a disintegration and positive battering of the mica flakes whereby the ones descending into the tower will fall upon a mica building plate 50 to seek a natural level by the law of average as indicated at 54 in Figure 4, it being understood that tower 7 is of such height as to insure the perfect tranquility of the air adjacent the lower end of the tower whereby air currents, eddies or other whirling motions and disturbances will not be present. When one quantity of mica flakes has entirely passed through the machine in the manner above described and evenly distributed upon a mica building plate 50, the lever 46 is operated to cause disengagement of the band 44 with the upper end of the communicating receptacle 49 whereby operation of the gear 51 through the medium of the hand wheel 53 will permit the truck 48 to be operated to bring the disassociated receptacle into communication with the tower 7 and to be subsequently sealed by the felt strip 44′ upon the band 44. A second mica building plate 50 is superposed on the layer of mica flakes in the receptacle which has been removed from the tower 7 and this reverse operation may be operated until the desired number of mica plates are arranged in the receptacle.

The method of treating the mica building plates thus formed, includes the removal from the receptacle of the plates 50 with the mica flakes 54 arranged therebetween which may be accomplished by collapsing the sides of the receptacles 49 and subsequently clamping the plates 50 together at which time the same may be partially immersed in an adhesive solution and by capillary attraction causes the adhesive substance to permeate the entire mass of mica flakes, or if desired, the plates held in clamped formation may be entirely immersed in a binding solution.

While there is herein shown and described, the preferred embodiment of the invention, it is nevertheless to be understood that minor changes may be made in the form, combination and arrangement of parts without departing from the spirit and scope of the invention as claimed.

Having thus described my invention what I claim as new and desire to secure by Letters-Patent is:

1. In a machine of the type described, the combination with a tower, of means for feeding flake material to the upper end thereof, means adapted to batter the flakes upon entering the tower, and means associated with the battering means to cause the flakes to travel in a directly reverse path, said last named means enclosing the battering means and being open at the upper and lower ends thereof.

2. In a machine of the type described, the combination with a tower, and a pipe suspended therein, of means for feeding flake material to said pipe, and battering means associated with the lower end thereof.

3. In a machine of the type described, the combination with a tower and a pipe suspended therein, of an endless belt for feeding flake material to said pipe, a distributing guard associated with said belt, and battering means associated with the lower end of said pipe.

4. In a machine of the type described, a tower, flake delivering and battering means associated with the upper end thereof, and a receptacle having sealing connection with the lower end of the tower.

5. In a machine of the type described, a tower, flake delivering and battering means associated with the upper end thereof, and receptacles interchangeably having sealing connection with the lower end of the tower.

6. In a machine of the type described, a tower, flake delivering and battering means associated with the upper end thereof, a truck located beneath the tower, receptacles mounted on the truck, means for moving the truck to bring each receptacle into communication with the tower, and means for forming a sealing connection between the tower and receptacles.

7. In a machine of the type described, a tower, flake delivering and battering means associated with the upper end thereof, a truck located beneath the tower, receptacles mounted on the truck, means for moving the truck to bring each receptacle into communication with the tower, and means for forming a sealing connection between the tower and receptacles said last named means including a band and operating lever therefor carried by the tower.

8. In a machine of the type described, a tower, means within the tower having a perpendicular passageway therethrough and flake battering means associated with said means for creating a circuitous current from the lower end of said member to the upper end thereof.

9. The method of forming mica board consisting in floating mica flakes in suspension prior to settling upon successive building plates subsequently binding the building plates with the mica flakes therebetween, and finally treating with an adhesive solution.

In testimony whereof I have hereunto set my hand.

LOUIS T. FREDERICK.